(12) United States Patent
D'Souza

(10) Patent No.: US 8,983,075 B2
(45) Date of Patent: *Mar. 17, 2015

(54) CUSTODIAN SECURING A SECRET OF A USER

(71) Applicant: AlephCloud Systems, Inc., Sunnyvale, CA (US)

(72) Inventor: Roy Peter D'Souza, Belleview, WA (US)

(73) Assignee: PivotCloud, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/180,607

(22) Filed: Feb. 14, 2014

(65) Prior Publication Data

US 2014/0164769 A1    Jun. 12, 2014

Related U.S. Application Data

(63) Continuation of application No. 13/674,041, filed on Nov. 11, 2012, now Pat. No. 8,731,203, which is a continuation of application No. 13/613,080, filed on Sep. 13, 2012, now abandoned.

(60) Provisional application No. 61/598,071, filed on Feb. 13, 2012.

(51) Int. Cl.
*H04L 9/00* (2006.01)
*H04L 9/32* (2006.01)
*H04L 9/08* (2006.01)
*H04L 9/14* (2006.01)

(52) U.S. Cl.
CPC ................ *H04L 9/085* (2013.01); *H04L 9/088* (2013.01); *H04L 9/14* (2013.01); *H04L 9/0891* (2013.01); *H04L 9/321* (2013.01)
USPC .............................. 380/277; 380/286; 380/44

(58) Field of Classification Search
USPC ............ 380/277–279, 281–282, 284, 44, 47; 713/171, 189; 726/1
See application file for complete search history.

(56) References Cited

U.S. PATENT DOCUMENTS

| | | | | |
|---|---|---|---|---|
| 5,907,618 | A * | 5/1999 | Gennaro et al. | 380/286 |
| 7,167,565 | B2 * | 1/2007 | Rajasekaran | 380/282 |
| 7,471,792 | B2 * | 12/2008 | Yamamichi et al. | 380/44 |
| 7,551,740 | B2 * | 6/2009 | Lee et al. | 380/278 |
| 8,731,203 | B2 * | 5/2014 | D'Souza | 380/277 |

\* cited by examiner

*Primary Examiner* — Hosuk Song
(74) *Attorney, Agent, or Firm* — Brian R. Short

(57) ABSTRACT

Methods, systems and apparatuses for a custodian securing a secret are disclosed. One method includes receiving, by a custodian server of a first custodian, encrypted shares, wherein the encrypted share are generated based on a secret of the user, a policy, and a plurality of public keys, comprising generating a plurality of shares from the secret, and encrypting each share utilizing a corresponding one of the plurality of public keys. The method further includes verifying, by the custodian server, that the encrypted shares can be used to reconstitute the secret upon receiving the encrypted shares, comprising leveraging, by the first custodian, one-way cryptographic functions, wherein the first custodian can reconstruct the secret, but cannot obtain access to the secret or any of the shares.

17 Claims, 8 Drawing Sheets

CUSTODIAN SECURING A SECRET OF A USER

RELATED APPLICATIONS

This application is a continuation of U.S. patent application Ser. No. 13/674,041, filed Nov. 11, 2012, and entitled "Securing a Secret of a User", which is a continuation-in-part (CIP) of U.S. patent application Ser. No. 13/613,080, filed Sep. 13, 2012, and entitled "Providing Trustworthy Workflow Across Trust Boundaries" which claims priority to U.S. Provisional Patent Application No. 61/598,071, filed Feb. 13, 2012, and entitled "High-Scale and Distributed Business and Consumer Networks," all of which are hereby incorporated herein by reference.

FIELD OF THE DESCRIBED EMBODIMENTS

The described embodiments relate generally to electronic communication through networks that include clouds. More particularly, the described embodiments relate to methods, systems and apparatuses for a custodian securing a secret of a user connected to the network or clouds.

BACKGROUND

A trust boundary in an electronic network is defined as a region within which all computer systems, their operations, and the data are trusted. Typically, a trust boundary is protected by computer security hardware and software such as firewalls, Virtual Private Networks (VPNs), intrusion detection and prevention systems, data leakage protections, anti-virus programs, etc. For example, for an organization, a trust boundary may include an entire data center infrastructure, including computers connected via VPNs. For an individual, a laptop computer could be her trust boundary.

Various mechanisms exist today to facilitate secure communications between trust boundaries. SSL/TLS and IPSec are two examples. These mechanisms are intrinsically point-to-point, thus for many-to-many secure information sharing and collaboration, it will require a worst case "N-squared messy cross-bar" connectivity for all N trust boundaries where every party needs to be able to field electronic communications from every other party. This can become costly and complex for reasons that might include the need for every party to standardize on the same technology, or for each party to interoperate with other parties that might be deploying dissimilar technologies.

On the other hand, Web based technologies, and now cloud computing make information sharing and collaboration increasingly cheaper and easier. Any party that deploys technologies of their choice would need to deploy integration with just the hub. In essence, this is a central intermediary based hub-spoke communication model. While this simplifies deployment and operation, the hub has full visibility and control over all communications. Therefore, when it comes to secure sharing, this model requires that the central intermediary to be a trusted escrow that must be trusted by all parties across all trust boundaries in the network and that no one in the network will surreptitiously game the system for their own profit.

Such a blind trust hub-spoke model tends to fail due to a range of challenges that include breaches of hub's electronic perimeters, insider attacks, coercion from governments and organized crimes, and other threats to the hub. All indications are that any model that involves conventional electronic security, and is based on a need to trust any central individual or organization to follow the rules, is deeply flawed. This is demonstrated by the fact that even with improvements in technologies for monitoring and protection, the rate of successful intrusions and internal malfeasance is actually rising rapidly.

When an individual's information is stored in the cloud, managed by a cloud service provider, there is no guarantee that his/her data privacy will be protected. Most cloud services require a user's password to authenticate an individual. Despite of cloud vendors' relentless effort to protect users' passwords, the number of incidents of large scale password breaches is only increasing.

In present day enterprises, the custodian (typically the hub, the infrastructure service operator/provider in physical possession of the sensitive data) and the curator (typically some spoke, perhaps the IT organization that owns and authorizes access to this data) are within the same organization, and most likely within the same legal and compliance domain. Authentication is typically implemented through techniques such as Kerberos; authorization is typically through infrastructure such as AD and Security Groups; access control is enforced by the various data containers that include databases, document management systems, and networked file systems. Organizations also leverage PKI and X.509v3 for identity and possibly authorization, and access through Smart Cards, SAML for single sign-on and authorization. Various technologies exist for the organization to implement its own Authentication and Authorization, and to federate beyond that organization with business partners and other service providers or service consumers.

When IT infrastructures such as data storage or containers are moved to a hosting service in the cloud, the role of the custodian and curator is separated, where the cloud service provider that is hosting the data is now the custodian of that data, while the curatorship continues to remain in the hands of functionaries within that organization. For legal, compliance and other business IP protection reasons, organizations can't afford the blind trust on the cloud service providers, thus are disinclined to adopt these services, or they demand unlimited liability protection.

In order to solve this problem, the cloud needs to be constrained in function to be only a policy enforcement service that is implementing the exact policy specified by the customer organization and its curator functionary. The curator needs sufficient visibility into, and control over actions performed by the custodian. Furthermore, this new cloud architecture needs to seamlessly integrate, without any significant requirement to modify the existing IT infrastructure, or the existing business process.

In short, there is no solution existing today that can allow organizations (curators) to extend the existing IT infrastructures along with the business processes (such as Governance, Risk Management, and Compliance, GRC in short) to the cloud service providers (custodians), across the trust boundaries while a) the data privacy and confidentiality are ensured—custodians can never see the data nor the policies about how the data can be accessed; b) the visibility and the control of the data are fully retained by the curators; and c) multiple curators across trust boundaries can collaborate and share the sensitive data through the custodians.

There is a need for systems, methods and apparatuses that address the above-listed requirements in cloud computing, and provide a trustworthy workflow across trust boundaries between parties. While 'trust' is typically grounded in the physical world, and derives from relationships, contracts, and legal protection, 'trustworthy' can be defined an attribute of a technology, typically based on cryptography, that provides to the curator guarantees against human accident, negligence or malfeasance, by the custodian.

A trustworthy workflow is defined as a cryptography based mechanism that enables all parties to securely communicate across trust boundaries through the central intermediary (the hub), without the hub ever being able to access the data, nor the data access policies. All end-points in such a workflow can count on the same degree of trustworthiness of a point-to-point secure communications supported by protocols such as SSL/TSL and IPSec, as described before.

It is desirable to have methods, systems and apparatuses for securing a user's secret while addressing the problems listed above.

SUMMARY

An embodiment includes a method of a custodian securing a secret of a user. The method includes receiving, by a custodian server of a first custodian, encrypted shares, wherein the encrypted share are generated based on a secret of the user, a policy, and a plurality of public keys, comprising generating a plurality of shares from the secret, and encrypting each share utilizing a corresponding one of the plurality of public keys. The method further includes verifying, by the custodian server, that the encrypted shares can be used to reconstitute the secret upon receiving the encrypted shares, comprising leveraging, by the first custodian, one-way cryptographic functions, wherein the first custodian can reconstruct the secret, but cannot obtain access to the secret or any of the shares.

Another embodiment includes a custodian server of a custodian. The custodian server is operative to receive encrypted shares, wherein the encrypted share are generated based on a secret of the user, a policy, and a plurality of public keys, and wherein a plurality of shares are generated from the secret, and each share is encrypted utilizing a corresponding one of the plurality of public keys. The custodian server is further operative to verify that the encrypted shares can be used to reconstitute the secret upon receiving the encrypted shares, comprising leveraging, by the custodian, one-way cryptographic functions, wherein the custodian can reconstruct the secret, but cannot obtain access to the secret or any of the shares.

For at least some embodiment, when the user has lost or forgotten the secret, or if the user is unavailable and an organization of the user desires to recover the secret, at least some embodiments include an adjudication workflow that is facilitated by a custodian such that the supplicant (the user, or the authorized party) is able to reconstitute that secret. If adjudicators are involved in this workflow then the adjudicators participate in this workflow. For at least some embodiments, an underlying cryptographically enforced policy ensures that the custodian never gets to view the secret, and any subset of adjudicators that does not meet the policy, are able to recover the secret.

Other aspects and advantages of the described embodiments will become apparent from the following detailed description, taken in conjunction with the accompanying drawings, illustrating by way of example the principles of the described embodiments.

DETAILED DESCRIPTION

Figure 1:
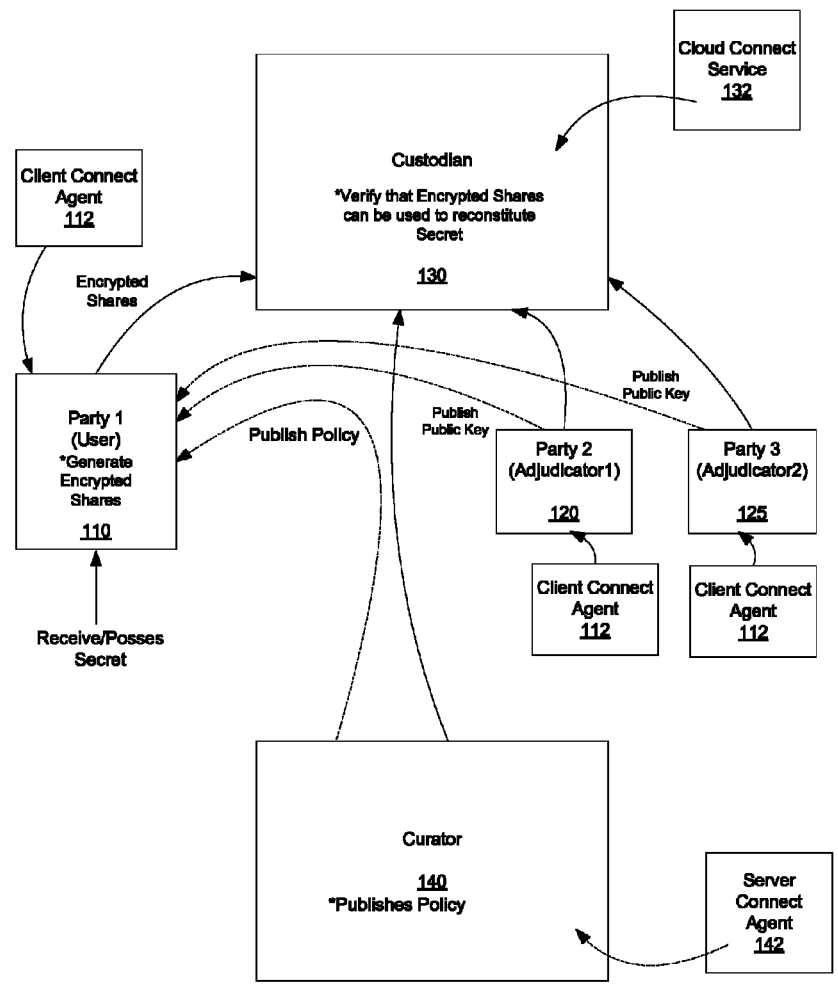
FIG. 1 shows a system for securing a secret, according to an embodiment.

The described embodiments include methods, systems and apparatuses for securing a secret (such as, a password) of a user. Further, at least some of the described embodiments include escrowing of the secret, and reconstituting the secret by a custodian. Further, at least some of the described embodiments do not allow the custodian to have any access to the secret. In the physical world it is difficult to monitor the actions of a single trusted party, and there are various physical processes to monitor and regulate these accesses through workflows that involve other parties. In the electronic world the difficulties are severe because the parties could be remote, and it is usually difficult—if at all possible—to monitor their actions. The described embodiments provide implementations in the electronic world that enable policy regulations and enforcements of secret accesses across trust boundaries.

There is an elevated level of interest in, and an increasing degree of adoption of cryptographic techniques to restrict the rights of an authorized party, or to preclude access by an authorized party, and to provide monitoring and control of trusted parties. However these techniques are stymied by the fact that cryptography is complex to deploy and use, and it is commonplace for participants in the workflows to forget their passwords or lose their secret keys. A common solution is to escrow these secrets with a trusted central party, which precipitates the primary issue of malfeasance by that all-powerful party.

Presently, international trade is a manifestation of the problem, since the buyers and sellers are remote and could be anonymous or difficult to track. Furthermore, since these buyers and sellers are distributed across legal boundaries, it is costly and complex for the buyer or the seller to seek redress in case of non-performance or fraud. Therefore organic growth of methods for international trade can be observed in the physical world, which has evolved from an art into a science that is instituted to protect the buyers and the sellers through intermediaries such as banks and financial institutions, and legal and currency instruments such as letters of credit.

The adoption of high-scale and geo-distributed clouds enabled cost effective interactions of buyers and, but the consequence is the difficulty for the existing processes and intermediaries to scale up to be effective.

One of the benefits of the described embodiments is the enablement of the transfer of custody of a good, primarily an electronic asset such as a payment, or valuable information, through support of adjudication where the appropriate intermediaries can weigh in, typically during mediation when there is a dispute between a buyer and a seller, so that the secret (and consequently the access to the electronic asset that it protects), is released per the established processes in international trade.

There are a multitude of present-day workflows that involve the careful release of a secret that is perhaps gated by an event, or a time period. For example, a press release that can only go out after an internal review process, or an announcement of quarterly or annual earnings of a corporation that needs to be released at a pre-established date and time. It is not uncommon for human error or negligence for these to be preemptively released, often with the consequence of monetary loss or dilution of a brand. The described embodiments for adjudication of secrets can cryptographically enforce the internal review process, or the time-based controls such that it is infeasible to circumvent the implemented process.

An increasingly common workflow is the need for application or service providers to respond to government requests for customer data for reasons that might include law enforcement or national security. This is a cause for serious concern because the customers of these services have no visibility into the release of their data, and in cases where these services cross sovereign boundaries it might be viewed to constitute industrial espionage. This can place US businesses at a disadvantage in international markets, because of real or imagined concerns that organizations such as the Department of Homeland Security, or regulations such as the Patriot Act, might be inappropriately accessing the sensitive business data of foreign customers using electronic services provided by US businesses. The Adjudication workflows enabled by the described embodiments can provide strong guarantees to foreign governments, corporations and consumers that the service provider or the government are precluded from circumventing established process (for example, the government of the sovereign region of the customer might become an essential adjudicator in a workflow for release of that customer's data.)

For the Figures and embodiments described, the Custodians, Curators, Users and Adjudicators are references to roles in the trustworthy workflows. The Client Connect Agents (CCAs), Cloud Connect Service (CCS) and Server Connect Agents (SCAs) are one embodiment of an implementation that facilitates these trustworthy workflows. As described, at least some embodiments of the CCA, the CCS and the SCA include software, downloadable software, or accessible software operable on or accessible by servers of the custodians, the curators and the users.

FIG. 1 shows a system for securing a secret, according to an embodiment. As shown, a user 110 receives or otherwise comes into possession of a secret. For an embodiment, the user 110 generates encrypted shares based on the secret, a policy, and a plurality of public keys.

For an embodiment, the encrypted shares are generated by generating a plurality of shares from the secret, and encrypting each share utilizing a corresponding one of the plurality of public keys. For an exemplary embodiment, the plurality of shares is generated from the secret using a technique such as Shamir's secret sharing.

Shamir's secret sharing is an embodiment of a cryptographic technique for implementing a process. Shamir's secret is based on LaGrange Interpolation, which is a mathematical technique for reconstituting a polynomial given sufficient points on the curve, based on the degree of the polynomial. Shamir's technique leverages it by storing the secret to be protected on the Y-Axis (with X=0) using a randomly generated polynomial, and then oversampling the points on the curve to generate a "threshold circuit". Such a threshold circuit can be used to generate OR and AND gates, and to further cascade them to generate a hierarchy of AND-OR gates that can be used to specify a policy that needs to be met before that original secret can be recovered.

In an embodiment where there are adjudicators (such as, adjudicators 120, 125), each of the shares generated in the processes of the described embodiments is encrypted to the public key of one of the adjudicators. During this process of generation of shares (which is a part of the "enrollment" or "escrow" workflow) the adjudicators do not need to be present, hence the mechanism is efficient and amenable to deployment at "cloud scale". However the adjudicators need to be present during the final workflow of recovery of the secret. Since there is no guarantee that all the required adjudicators will be available, the policy accommodates "threshold" circuits such that only a subset of the anointed adjudicators needs to be present and available. In addition, the composition through AND and OR enables the construction of circuits that represent conflict resolution, mediation, government subpoenas and warrants, press releases, releases of earnings statements, etc.

For an embodiment, the policy is provided by a curator 140. The curator 140 publishes the policy, which the user 110 is able to access through a custodian 130.

A curator (such as, curator 140) is an individual, or representative of an organization that has ownership of the secret. In a business scenario this individual might be an authorized IT manager, a GRC (Government, Risk Management and Compliance) officer, or perhaps an executive of the company. In an embodiment the curator can leverage the convenience of the CCA (such as, CCA 142) to transparently manage the complexities of the adjudication policy definition, the cryptography and the key management, and leverage the CCS (such as, CCS 132) for identifying and selecting suitable adjudicators. In a consumer scenario it is usually the case that the owner of the secret is also the curator and hence the party that selects the adjudication policy. In business scenarios it is possible that the curator is an IT or GRC functionary that will define the adjudication policy for the secrets that are subsequently escrowed by any individual that is part of that company.

It is to be understood that for at least some embodiments, a curator (utilizing a CCS) may also have its own high-level curator (also utilizing a CCS). That is, the curator may also itself utilize a CCA (thereby, assuming the role of, for example, a user), and additionally utilized the high-level curator within its trust boundary.

An embodiment of a policy in the context of a cloud storage service in support of a government subpoena or warrant includes an AND circuit that requires a share from the service provider, an authority representing the government serving the subpoena or warrant, and an authority representing the government of the customer. In that manner it is possible for implementing subpoenas and warrants with an associated gag order (so that the customer is unaware of the implementation) perhaps for purposes of monitoring or surveillance, since the government of that customer will ensure that the rights of their citizens are not violated, while still enabling legitimate activities such as terrorism and trafficking.

Another embodiment of a policy includes a threshold circuit that states that "k" out of "m" (perhaps two out of ten) executives of a corporation (perhaps officers of the company) need to agree before a press release, or an earnings statement can be published. The threshold can be suitably tuned so that there is sufficient redundancy in case some of the executives are unavailable, but also that it is sufficiently high such that inappropriate collusion would be restricted.

In the consumer world, imagine a teenager that needs to escrow a password in case of an emergency, but worries that either their friends or their parents might collude, and would hence define a policy that requires an AND circuit of a threshold of friends (perhaps 2 out of 3) and a threshold of parents (1 out of 20) would need to agree to unlock that secret.

In these embodiments it is not always necessary for there to be external adjudicators that have "registered" by publishing their public keys. It is also possible to generate a set of "virtual adjudicators" by a mechanism such as a set of questions posed to the user during the escrow process, where the answer that is only known to that user is used to derive a key pair. Subsequently during the reconstitution process, the user is posed the same questions, and it is assumed that the questions would have been suitably selected, and the threshold would have been carefully picked such that only the user knows the answer to exceed the threshold, while also accommodating for memory lapses when answering some of the questions.

In this exposition an adjudicator is some individual, organization or electronic process that is represented by an asymmetric cryptographic key pair. During a previous enrollment process that adjudicator would have published their public key to the CCS and suitably safeguarded their own secret key.

In a deployment an adjudicator might be a federal official. Or the adjudicator might be a function provided by the Department of Motor Vehicles, or the US Passport Office. Similar to the process of certifying an individual to serve as a Notary Public one can visualize a mechanism for governments or other organizations to enable individuals of standing or authority to serve as adjudicators.

To protect against government excess, perhaps one might deploy the community of retired judges to serve as adjudicators, and to extend every policy with an AND clause at the root that would require a threshold of retired judges to adjudicate, with the assumption that in an egregious violation of government authority there would be respected and courageous individuals that are knowledgeable in the legal domain and credible and safe when violating any associated gag order.

Figure 2:
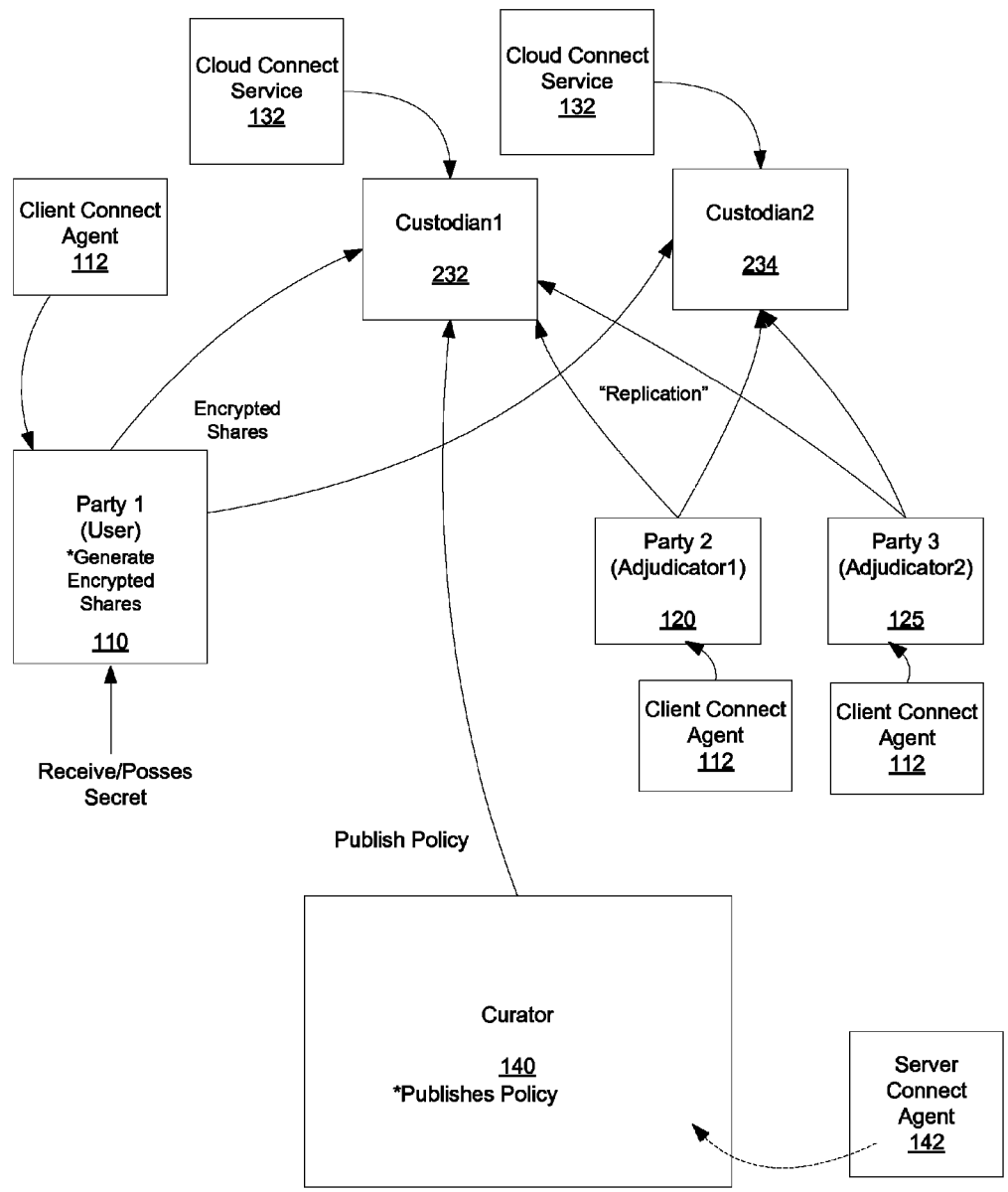
FIG. 2 shows another system for securing a secret, according to an embodiment.

The embodiment of FIG. 1 includes a plurality of adjudicators 120, 125 that publish the plurality of public keys. The user 110 is able to access the public keys through the custodian 130. For an embodiment, each adjudicator provides at least a public key, and each public key has a corresponding secret key. While FIG. 1 includes adjudicators 120, 125, another embodiment as described later includes self-adjudication. While FIG. 2 shows two adjudicators, it is to be understood that various embodiments include any number of adjudicators.

One embodiment of a public key pair leverages an underlying standard technology such as ECIES (Elliptic Curve Integrated Encryption Scheme) to generate a key pair that consists of a public key that is published to the CCS and the associated secret key that is private to just the adjudicator. To ensure that the public key is authentic the embodiment might leverage technologies such as X509 certificates and common processes such as PKI. To ensure that the secret key is not lost or compromised, the CCA might prompt the adjudicator during the enrollment step for a password and then encrypt the secret key with a suitable algorithm using a key derived from that password. Or in other embodiments there might be integration with higher-security PIV cards that would facilitate protection of the secret key and attestation of the public key.

Once generated, the encrypted shares are provided (uploaded) to the custodian 130. For an embodiment, upon receiving the encrypted shares, the custodian verifies that the encrypted shares can be used to reconstitute the secret. For a specific embodiment, the verification includes the custodian leveraging one-way cryptographic functions, wherein the custodian can reconstruct the secret, but cannot obtain access to the secret or any of the shares. For a more specific embodiment, the cryptographic one-way function includes a cryptographic pairing.

This verification step is a pivotal step in enabling the described embodiments of trustworthy workflows. The reason is that when the user escrows a secret, it is impractical to execute a synchronous workflow at that time where every adjudicator would weigh in to collaboratively verify that the escrowed shares could indeed be reconstituted back into the original secret. This would be quite difficult in the physical world, and is impractical to implement at cloud scale. Since it is also an imperative for the custodian to not have access to the shares (and consequently to the secret) there needs to be a mechanism that enables the custodian (or any third party) to operate on the encrypted shares to verify that the secret can be reconstituted, but without gaining access.

There are established techniques in the literature for a third party to perform a public verification (Public Verification of Secret Sharing) to detect accidents or deliberate attempts to subvert the recovery process by the dealer (or the user in described scenarios). However there needs to be a technique that does not leverage non-standard cryptography (but just leverage standard cryptography such as that recommended by NIST, or that which is part of the NSA recommended Suite B) and it also needs to be sufficiently efficient and high-scale.

Since the mathematics is relatively complex, the following is an intuitive description that would be sufficient for someone that is skilled in the art to be able to select or design a technique that provides the necessary efficiency and scale. When the shares are encrypted to the public keys (of either the adjudicators, or the "virtual adjudicators") the software or hardware that is performing this operation (the CCA in this embodiment) will also generate a proof that facilitates public verification. Intuitively, this leverages a cryptographic guarantee known as the discrete log problem, where the proof might be delivered in the exponent of the generators of a carefully selected prime order group, and the consequent verification would operate in the exponent. The net result is that the verifier (the custodian in this embodiment) can validate the proof, but due to the discrete log problem, is precluded from obtaining access to the actual secret.

At least some embodiments of each of the user 110, the custodian 130, the curator 140, and the adjudicators 120, 125 include one or more servers. The servers are connected through networks. As described, the user 110 is connected to the network, which may be more generally referred to as the cloud, wherein the custodian 130 and the curator 140 are within the cloud.

As will be described, for at least some embodiments, the user 110 and the adjudicators 120, 125 are each controlled at least in part by a client connect agent (CCA) 112. An embodiment of CCA is an independent software application program running in the user's computing device or the adjudicator's computing device (server), such as desktop, laptop, mobile device, etc. Another embodiment of CCA is operable to run within a web browser. For an embodiment, an administrative module performs various configuration and administrative tasks to configure a local CCA, to manage users and groups within the CCA control, to interface with human users through a command line interface (CLI) or a UI interface (UI), to interface with other programs through an application programming interface (API), to update CCA software from the connected CCS, and to send event logs to CCS.

As will be described, for at least some embodiments, the custodian 130 is at least partially controlled by the cloud connect service (CCS) 132. For at least some embodiments, the CCS 132 is a collection of software running as Software as a Service (SaaS) in the cloud, hosted by one or multiple Infrastructure as a Service (IaaS) providers. For an embodiment, the CCS 132 is a high-scale, always-on, possibly geo-distributed policy enforcement point, which can facilitate complex, possibly cross-continental collaboration and commerce. The CCS 132 is termed "Trustworthy", meaning that it cannot access any data or policy in the clear or cheat because it is prevented from doing so by cryptography based technologies. Without such a capability it would be technologically complex to monitor and enforce CCS 132 behavior, if at all that were to be possible.

As will be described, the curator 140 is at least partially controlled by the server connect agent (SCA) 142. For an embodiment, the SCA 142 includes a software appliance that can be packaged as, but not limited by, a piece of executable program in a binary form, a virtual machine, or a dedicated server. For at least some embodiments, the software appliance runs within a curator's trust boundary.

For at least some of the described embodiments, the "Curator" and "Custodian" are logical entities, whereas the SCA, CCA and CCS are physical embodiments.

FIG. 2 shows another system for securing a secret, according to an embodiment. As shown, this embodiment includes a plurality of custodians 232, 234.

An embodiment leverages replication and involves providing more than one custodians with the same identical set of shares. The benefit is that any of these custodians can be contacted to initiate the reconstitution workflow. This facilitates resilience in the presence of failure of any custodial infrastructures, and also higher scale in the presence of multiple concurrent reconstitution requests.

Another embodiment includes leveraging partitioning of the shares at the originating CCA and then publishing each partition to a distinct custodian. The benefit of this approach is that these custodians need to engage in a multi-party protocol to facilitate the reconstitution workflows, which minimizes the possibility of a single custodian inappropriately releasing the shares (though the secret would be still protected until the cryptographic release policy was fulfilled).

As shown, each of the adjudicators 120, 125 are connected to each of the custodians 232, 234.

Figure 3:
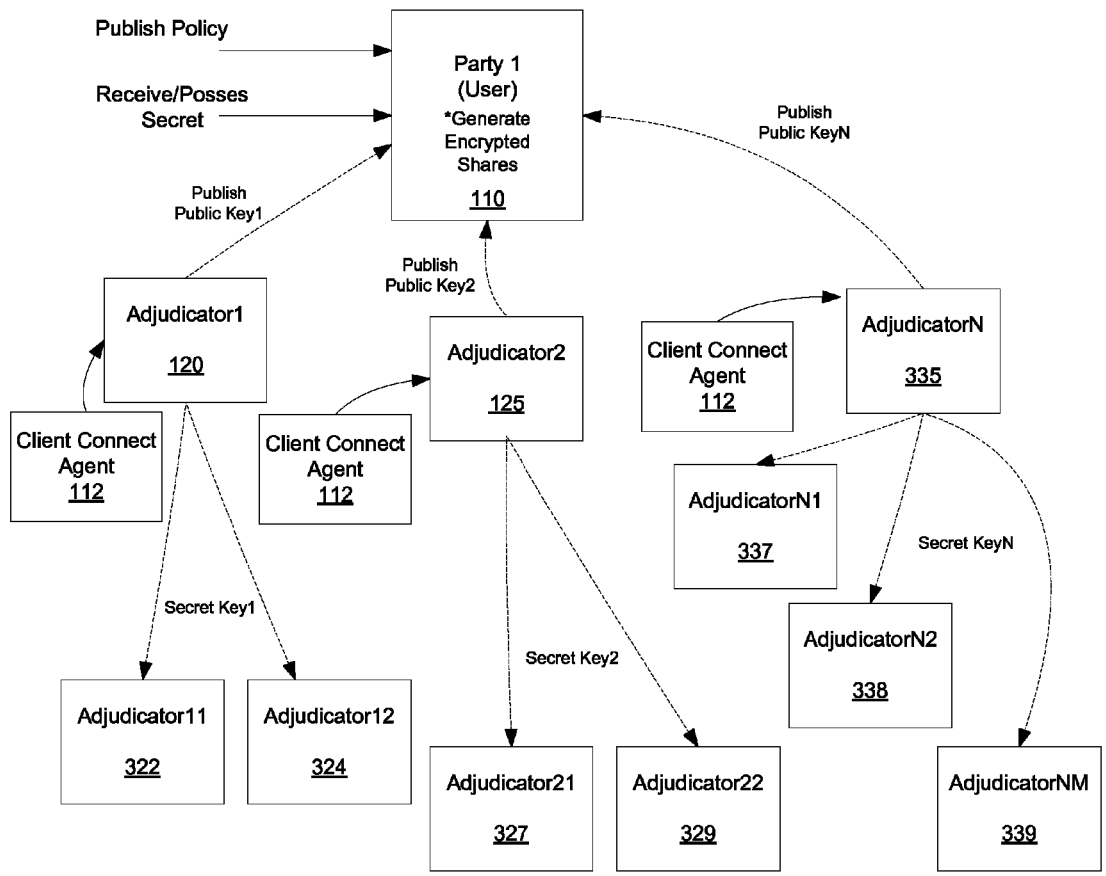
FIG. 3 shows a system for securing secret keys of adjudicators, according to an embodiment.

FIG. 3 shows a system for securing secret keys of adjudicators, according to an embodiment. As previously described, the user 110 secures a secret based upon the policy and the public keys of the adjudicators. Each of the public keys has a corresponding private key that can be secured as well.

FIG. 3 shows a functional representation of the user 110 generating encrypted shares based on the secret, the policy and N public keys. Further, private keys (secret keys 1, 2, . . . N) of the adjudicators 120, 125, 335 can each be secured based upon one or more different public keys and different policies. For example, the Secret Key1 of the first adjudicator 120 can be secured by public keys of adjudicator11 322 and adjudicator12 324. That is, the first adjudicator can generate encrypted shares base on the first secret key (Secret Key1), the public keys of adjudicator11 322 and adjudicator12 324, and a same or different policy as used by the user 110.

Further, the Secret Key2 of the second adjudicator 125 can be secured by public keys of adjudicator21 327 and adjudicator22 329. Further, the Secret KeyN of the Nth adjudicator 335 can be secured by public keys of adjudicatorN1 337, adjudicatorN2 338, and adjudicatorNM 339, This process of adjudication can further be used to secure the private (secret) keys of the adjudicator11 322, adjudicator12 324, adjudicator21 327, adjudicator22 324, adjudicatorN1 337, adjudicatorN2 338, and adjudicatorNM 339.

The simplified exposition of this network is represented as a tree in FIG. 3, which illustrates that the secret of any adjudicator can be adjudicated to a set of other adjudicators (presumably with a different adjudication policy). However, for at least one embodiment, in an actual deployment this is more of a connected network, rather than a tree. For example, Adjudicator22 might have their own secret escrowed to an AND circuit of Adjudicator1 and Adjudicator2. In general, any user with a CCA that is enrolled with the CCS can serve as an adjudicator to any other user. Though in practice, it is likely that users will need a level of certification or accreditation before they can serve as adjudicators for specific business, compliance, federal, or international workflows.

Figure 4:
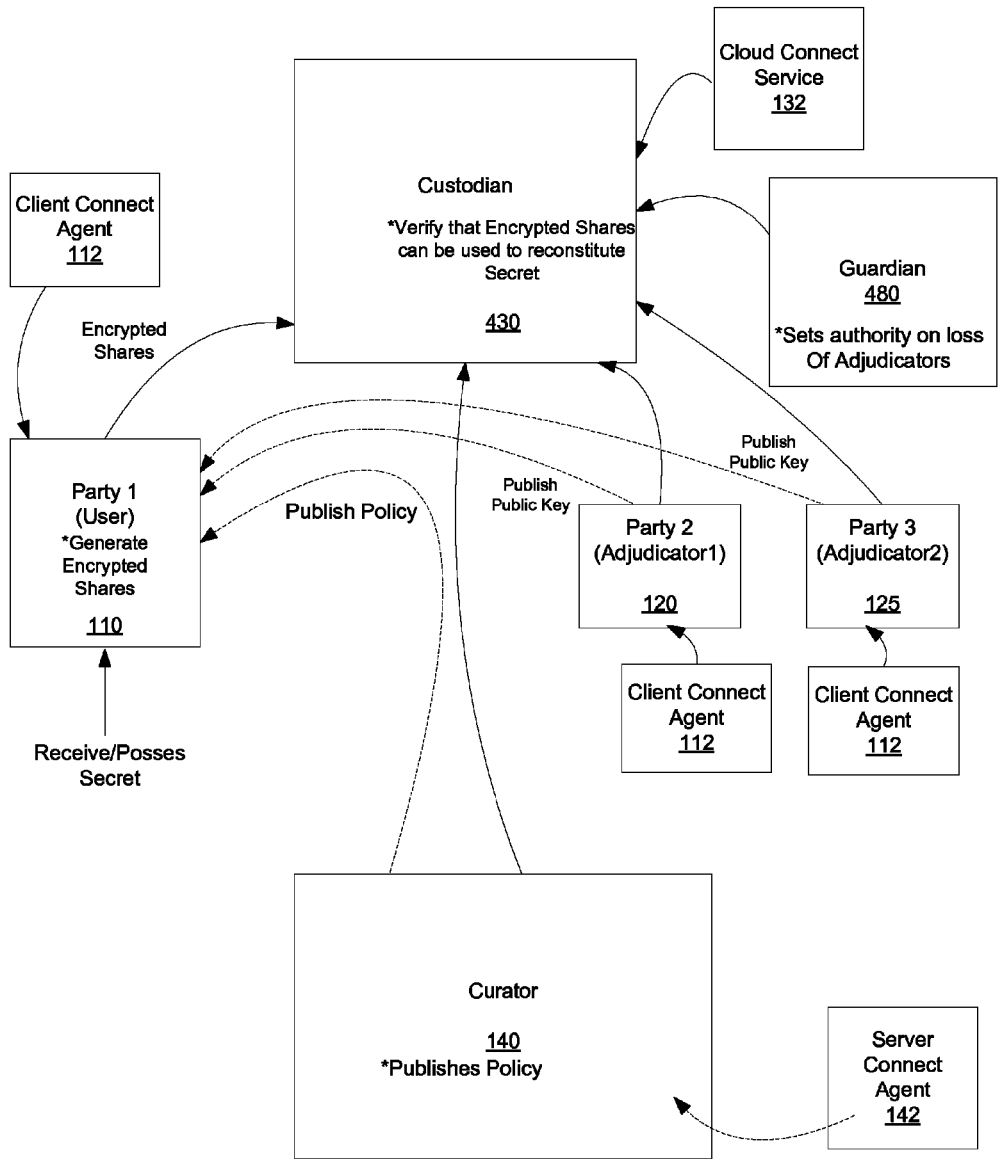
FIG. 4 shows a system that provides adaptation to losses of adjudicators, according to an embodiment.

FIG. 4 shows a system that provides adaptation to losses of adjudicators, according to an embodiment. As shown, this embodiment includes a guardian that monitors (maintains) a loss of adjudicators 120, 125.

For at least some embodiments, the guardian 480 includes an electronic process that is a delegate of an individual or an organization that is able to access the encrypted shares hosted by the custodian 430 and then analyze the connected network. Presumably that process is authorized by the custodian 430 to have access to the encrypted shares, and it is also highly likely that this guardian service might be owned and deployed by the custodian.

For an embodiment, the guardian 480 leverages common scale-out 'big data' techniques to constantly scan the network at some predefined interval to identify events such as the notification of the loss of a secret key, or notification of the exit of any adjudicator from the system. The guardian then needs to traverse the network to match the recovery policy of any escrowed secret to the available network of associated adjudicators.

For at least some embodiment, the objective is for the guardian 480 to proactively flag that an adjudication circuit will fail because an AND circuit will fail, or that the number of adjudicators has fallen below (or is approaching) the threshold of a threshold circuit. There would be a consequent workflow to notify the original user (or their organization) such that the secret could be re-escrowed to a new circuit.

Figure 5:
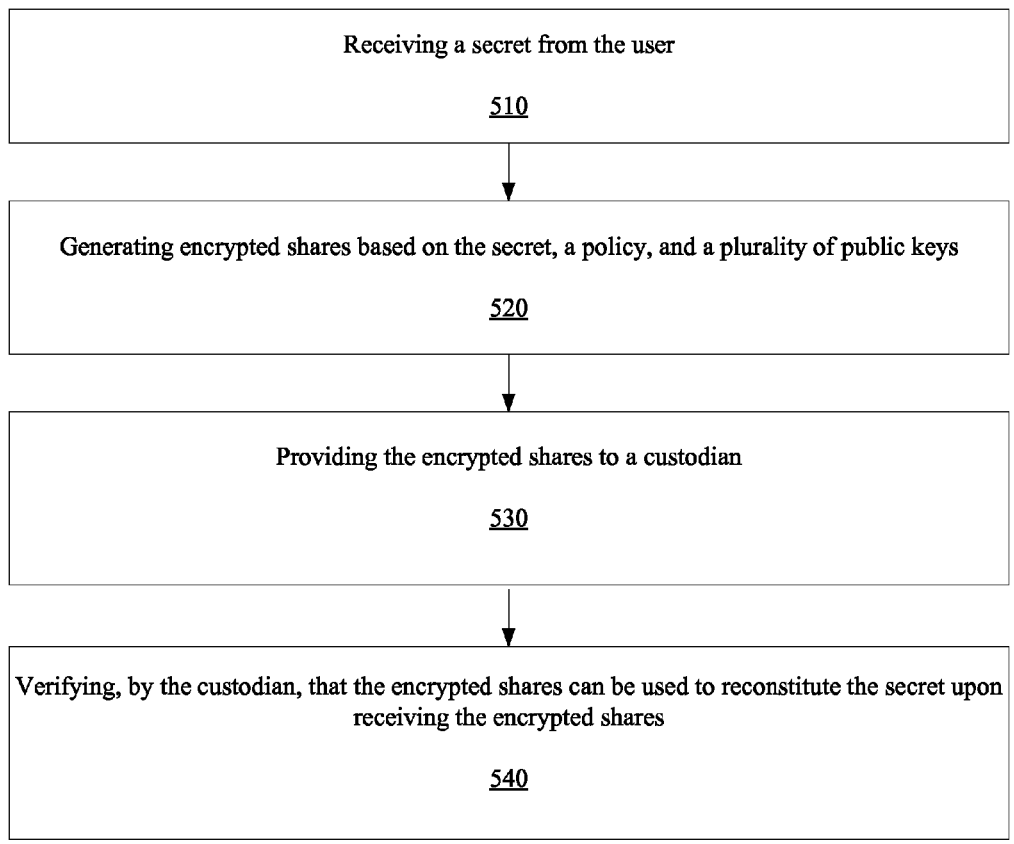
FIG. 5 is a flow chart that includes steps of a method of securing a secret, according to an embodiment.

FIG. 5 is a flow chart that includes steps of a method of securing a secret, according to an embodiment. A first step 510 includes receiving a secret (for an embodiment, the secret includes a password) from the user. A second step 520 includes generating encrypted shares based on the secret, a policy, and a plurality of public keys. A third step 530 includes providing the encrypted shares to a custodian. A fourth step 540 includes verifying, by the custodian, that the encrypted shares can be used to reconstitute the secret upon receiving the encrypted shares. For an embodiment, the user includes at least one of a user or delegate of the user. For an embodiment, generation of the encrypted shares based on the secret, a policy, and one or more public keys, is performed within a trust boundary.

From the custodian's perspective, for an embodiment, the custodian server operates a cloud connect service. The cloud connect service can be provided to the custodian server as a software as a system (SaaS) service or as software installed on the custodian server. An embodiment includes a non-transitory program storage device readable by a machine, tangibly embodying a program of instructions executable by the machine to perform a method securing a secret of a use. For this embodiment, the custodian server is operative to receive encrypted shares from a user server, wherein the encrypted shares based on a secret, a policy, and a plurality of public keys, an wherein the secret is received from a user of the user device, and verify that the encrypted shares can be used to reconstitute the secret upon receiving the encrypted shares.

From the user's perspective, for an embodiment, the user server operates a client connect agent. The client connect agent can be provided to the user server as a software as a system (SaaS) service or as software installed on the user server. An embodiment includes a non-transitory program storage device readable by a machine, tangibly embodying a program of instructions executable by the machine to perform a method securing a secret of a use. For this embodiment, the user server is operative to receive a secret from a user of the user server, generate encrypted shares based on the secret, a policy, and a plurality of public keys, and provide the encrypted shares to a custodian server; wherein the custodian server is operative to verify that the encrypted shares can be used to reconstitute the secret upon receiving the encrypted shares.

For an embodiment generating the encrypted shares includes generating a plurality of shares from the secret, and encrypting each share utilizing a corresponding one of the plurality of public keys. As previously described, for an embodiment, generating the plurality of shares from the secret utilizes a technique such as Shamir's secret sharing.

As previously described, an embodiment of the policy includes a threshold circuit that states that "k" out of "m" (perhaps two out of ten) adjudicators approvals are required in order for an event, such as, a press release, or an earnings statement being published. The threshold can be suitably tuned so that there is sufficient redundancy in case some of the adjudicators are unavailable, but also that it is sufficiently high such that inappropriate collusion would be restricted.

For an embodiment, verifying, by the custodian, that the encrypted shares can be used to reconstitute the secret upon receiving the encrypted shares includes leveraging, by the custodian, one-way cryptographic functions, wherein the custodian can reconstruct the secret, but cannot obtain access to the secret or any of the shares. As previously stated, the verification step of the custodian is a pivotal step in enabling the described embodiments of trustworthy workflows. When the user escrows a secret (that is, submits for securing of the secret), it is impractical to execute a synchronous workflow at that time where every adjudicator would weigh in to collaboratively verify that the escrowed shares could indeed be reconstituted back into the original secret. This would be quite difficult in the physical world, and is impractical to implement at cloud scale. Since it is also an imperative for the custodian to not have access to the shares (and consequently to the secret) there needs to be a mechanism that enables the custodian (or any third party) to operate on the encrypted shares to verify that the secret can be reconstituted, but without gaining access.

When the shares are encrypted to the public keys (of either the adjudicators, or the "virtual adjudicators") the software or hardware that is performing this operation (the CCA in this embodiment) also generates a proof that facilitates public verification. The net result is that the verifier (the custodian in this embodiment) can validate the proof, but due to the discrete log problem, is precluded from obtaining access to the actual secret.

An embodiment further includes a plurality of adjudicators, wherein each of the plurality of public keys has a corresponding at least one adjudicator of the plurality of adjudicators, and a corresponding secret key. Further, an embodiment further includes escrowing the corresponding secret key of one or more of the plurality of public keys. Further, for an embodiment, escrowing the corresponding secret key includes generating, encrypted shares based on the corresponding secret key, a policy (same or a different (second) policy), and a plurality of public keys, providing the encrypted shares to a second custodian. Further, for an embodiment, escrowing the corresponding secret key includes generating, encrypted shares based on the corresponding secret key, a policy (same or a different (second) policy), and a plurality of public keys, splitting the encrypted shares, and providing the split encrypted shares between more than one custodian. For an embodiment, the first custodian and the second custodian are part of a common network.

As previously stated, an embodiment leverages replication and involves providing more than one custodian with the same identical set of shares. The benefit is that any of these custodians can be contacted to initiate the reconstitution workflow. This facilitates resilience in the presence of failure of any custodial infrastructures, and also higher scale in the presence of multiple concurrent reconstitution requests. An embodiment further includes monitoring a loss of one or more of the plurality adjudicators. More specifically, an embodiment further includes providing the user with an early warning if the loss of adjudicators exceeds a threshold, thereby allowing the user to select new or different adjudicators.

An embodiment further includes releasing, by the custodian, the encrypted shares to approved parties upon occurrence of a given condition. Exemplary conditions include the custodian verifying a legitimate law enforcement request. More generally, the custodian verifies there is a legitimate 'break the glass' condition (logs request is from an authorized party and then releases). The break the glass condition releases the secret, but provides an identifiable trace of who got the secret and when. Another exemplary condition includes the custodian verifying is a simple time elapsed criterion that has been met. Another exemplary condition includes the custodian verifying that requestor has an authorized $3^{rd}$ party signature. For an embodiment, the given condition includes an event or a combination of events.

For an embodiment, verification by the custodian, that the encrypted shares can be used to reconstitute the secret is based upon the encrypted shares received by the custodian, the public keys and the policy.

For an embodiment, the approved parties comprise parties who have access to the encrypted shares. For an embodiment, the approved parties comprise parties who have secret keys that can decrypt the encrypted shares.

Self-Adjudication

At least some embodiments include self-adjudication, wherein adjudicators 120, 125 are not utilized. The self-adjudication process is particularly useful when a user needs to recover from a forgotten password.

For at least some other embodiments, a hybrid of self-adjudication and adjudicators is utilized. An example of a hybrid approach includes a hypothetical organization that wants to have visibility into, and control over the self-adjudication process. Perhaps the organization wants to make very sure that this is not somebody else that is trying to guess the answers to the questions (by virtue of being familiar with the user whose secret was escrowed). However the organization needs to make sure that it doesn't have direct access to that user's secret key (perhaps, for example, it's based in France, where this is mandated by French laws).

The hybrid scheme embodiment requires participation by the organization (and to not be serialized on a single internal watchdog, this might be some circuit that provides a degree of redundancy) and it also requires the user to self-adjudicate by being able to answer some number of questions correctly.

As previously described, in these embodiments it is not always necessary for there to be external adjudicators that have "registered" by publishing their public keys. It is also possible to generate a set of "virtual adjudicators" by a mechanism such as a set of questions posed to the user during the escrow process, where the answer that is only known to that user is used to derive a key pair. Subsequently during the reconstitution process, the user is posed the same questions, and it is assumed that the questions would have been suitably selected, and the threshold would have been carefully picked such that only the user knows the answer to exceed the threshold, while also accommodating for memory lapses when answering some of the questions.

For at least one embodiment, further includes in addition to receiving the secret, receiving a user name, a number n of security questions, and a threshold value k (the minimal number of security questions that user needs to answer correctly in order to recover its secret, password or passphrase), from the user. This embodiment also includes generating for each of the n security questions, key pairs SKi, PKi for encryption of subsequently created secret shares derived from the secret, and receiving N distinct questions Q[1] . . . Q[n] along with corresponding answers A[1] . . . A[n] to the N distinct questions Q[1] . . . Q[n] from the user. Encrypted shares are generated by deriving symmetric encryption keys KA[i] based on each of the answers, and encrypting each of the key pairs SKi, PKi based on a corresponding symmetric encryption key KA[i], to obtain encrypted keys ESK[1] . . . ESK [n]. An exemplary symmetric encryption keys include an AES key.

For an embodiment, providing the encrypted shares to the custodian includes uploading the encrypted keys ESK[1] . . . ESK [n] and the distinct questions Q[1] . . . Q[n] to the custodian. Further verifying that the encrypted shares can be used to reconstitute the secret upon receiving the encrypted shares includes generating secret shares SS[1] . . . SS[n], generating encrypted shares ESS[i] by encrypting each secret share SS[1] . . . SS[n] using the corresponding public key Pki, uploading the encrypted share ESS[1] . . . ESS[n], generating an asymmetric key pair (PK, SK), obtaining an encrypted asymmetric key ESK by encrypting the secret key SK using an symmetric encryption key PWD_K derived from a passphrase password as specified by a user, and uploading the encrypted asymmetric key ESK. An exemplary encrypted asymmetric key includes an RSA key ESK, which can be stored in the network.

If, for example, the user forgets the secret (for example, password), an embodiment further includes prompting the user to select and provide answers A'[1] . . . A' [k] to the k security questions Q[1] . . . Q[k], downloading, by the user device, encrypted shares ESS[1] . . . ESS[k] and encrypted keys ESK[1] . . . ESK[k], deriving keys KA[1] . . . KA[k] from the provided answers A'[1] . . . A' [k]; (an incorrect answer yields an incorrect key), attempting to decrypt ESK[1] . . . ESK[k] using the keys KA[1] . . . KA[k], obtaining the secret keys SK[1] . . . SK[k], decrypting the encrypted shares ESS [1] . . . ESS[k] using the secret keys SK[1] . . . SK[k], obtaining the secret shares SS[1] . . . SS[k] based on the encrypted shares ESS[1] . . . ESS[k], recovering the password or the symmetric encryption key PWD_K using the secret shares SS[1] . . . SS[k] if the provided answers A'[1] . . . A' [k] are correct.

Assuming that the answers A[1], . . . , A[k] are correct, the secret shares SS[1], . . . , SS[k] are then used to recover the original secret (either PWD or PWD_K).

For an embodiment, if the provided answers are determined not to be correct, then the user is prompted for a new set of k security questions and answers. For an embodiment, if the provided answers are determined to be correct, then the user is allowed to change the secret.

Examples of Securing a Secret

A first example includes a trustworthy threshold based business approval process. This example includes the curator disperses a secret to 'n' Adjudicators (with 'k' threshold). At a later time, the curator accesses the secret to perform a business function. Subsequently, the custodian sends out request to the 'n' Adjudicators, wherein the custodian provides the custodian's own public key, and a signed request. Subsequently, at least 'k' Adjudicators respond with their respective shares, but log the event. The adjudicator checks the signature, then encrypts share to custodian's public key.

A second example includes Trustworthy Event-based Release (for example, related to an earnings statement, a news release, or a will). This example includes essentially the same workflow as the last example, but further includes the condition that each adjudicator checks the policy (event, or time) specified by the curator. The curator then disperses a secret to 'n' Adjudicators (with 'k' threshold). Further, the curator associates a "release criteria", such as, time expired, or an exogenous event. To perform a business need, the custodian initiates access of the secret. The custodian then sends out request to the 'n' Adjudicators, wherein the custodian provides the custodian's own public key, and a signed request. At least 'k' Adjudicators conditionally respond with their respective shares. The adjudicator checks for event having occurred, and denies if event has not occurred. The adjudicator checks signature, then encrypts share to custodian's public key.

A third example includes trustworthy Retention, Disposition, Hold. This example includes the same workflow, but in addition, Adjudicator discard their share if retention period has ended, and there is no Hold placed.

A fourth example includes Systems Innovation. This example includes leveraging of high-speed (Dynamic) DNS for implementation of the Adjudicators. This embodiment includes a very light-weight request-response that can be leveraged for implementing these light-weight Adjudicators. The address of the Adjudicator (DNS server) in this case is obfuscated, so that it is harder for a third party to subvert them. Access to the Adjudicator is a "Capability" (that will be the DNS server's IP address in this case). The Curator directly publishes the encrypted shares to the various Adjudicators, and conditionally release the Capabilities to the Custodian network. Perhaps these are provided piecemeal, etc. Here the "Custodian" does not do any public verification, and can be essentially any "supplicant". The onus is upon the Curator to verify that the correct shares have been conveyed to the correct Adjudicator.

Figure 6:
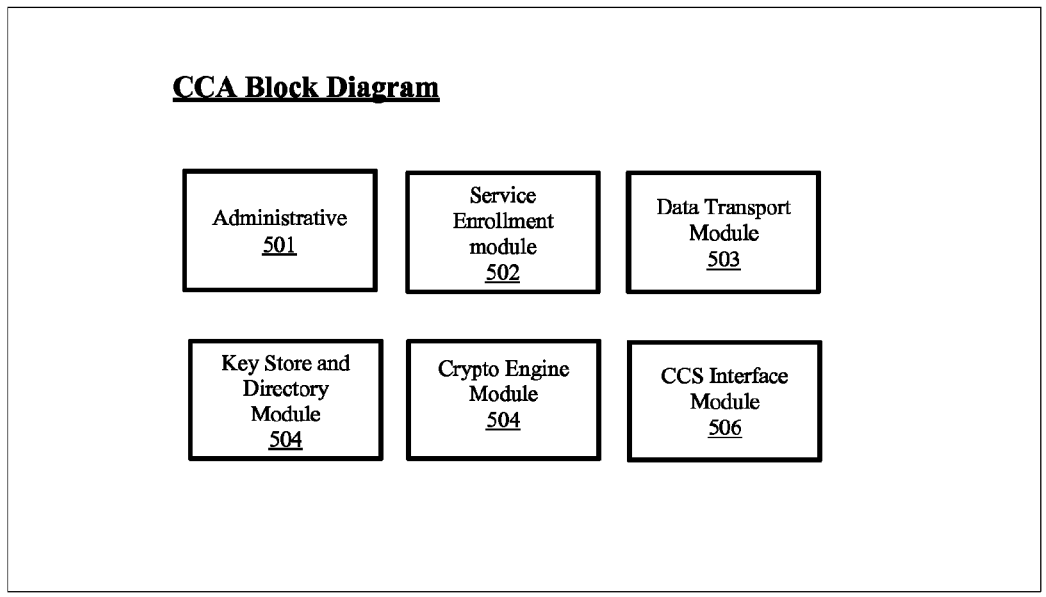
FIG. 6 shows a client connect agent according to an embodiment.

FIG. 6 shows an embodiment of the client connect agent (CCA) according to an embodiment. As described, an embodiment of CCA can be an independent software application program running in the user's computing device, such as desktop, laptop, mobile device, etc. Another embodiment of CCA is operable to run within a web browser.

As shown, this embodiment includes at least the following modules an Administrative Module 501, a Service Enrollment Module 502, a Data Transport Module 503, a Key Store and Directory Module 504, a Crypto Engine Module 505, and a CCS Interface Module 506.

For an embodiment, the Administrative Module 501 performs various configuration and administrative tasks to configure the local CCA, to manage users and groups within the CCA control, to interface with human users through a command line interface (CLI) or a UI interface (UI), to interface with other programs through an application programming interface (API), to update CCA software from the connected CCS, and to send event logs to CCS via CCS Interface Module 506.

For an embodiment, the Service Enrollment Module 502 performs enrollment tasks with a realm that is represented by one or more curators. The Service Enrollment Module 502 also manages the password and the login process with the connected CCS, among others.

For an embodiment, the Data Transport Module 503 is responsible for data upload and download. The data can be uploaded from the compute device where the CCA operates and to any data repository in the cloud through any data transfer protocol such as email, HTTP, FTP, etc. or physical data storage media such as floppy disc, CD ROM, DVD ROM, USB Drive, etc., and vice versa.

For an embodiment, the Key Store and Directory Module 504 stores local user's secrets (such as the private/secret keys,) that are encrypted and copies of various certificates that can be used for local CCA cache access and offline operations.

For an embodiment, the Crypto Engine Module 505 performs various encryption/decryption, signing, and key generation functions.

For an embodiment, the CCS Interface Module 506 performs secure communications with CCS. For at least some embodiments, the CCS Interface Module 506 includes a RESTful interface Adapter—CRUD calls for data and control communications between SCA and CCS, a WebSockets—Receive Callbacks from CCS, and a DNS Resolver—fast path for querying the CCS for directory (certificates) lookup and requesting for proxy re-encryption operations.

Figure 7:
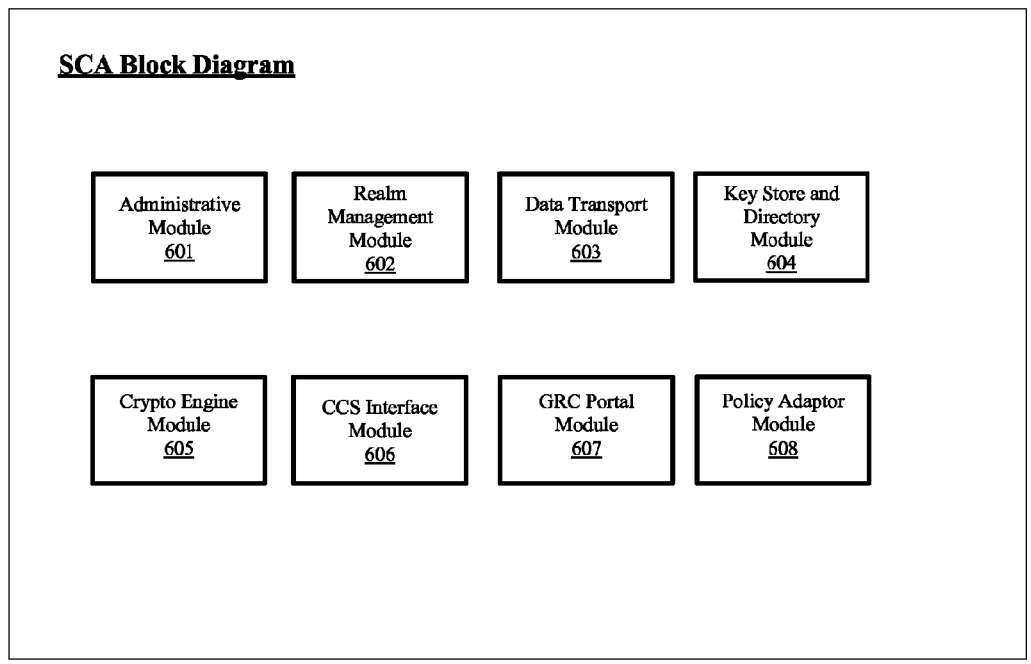
FIG. 7 shows a service connect agent according to an embodiment.

As shown, the one or more curators 140 are at least partially controlled by a server connect agent (SCA) 142. For an embodiment, the SCA 142 includes a software appliance that can be packaged as, but not limited by, a piece of executable program in a binary form, a virtual machine, or a dedicated server. For at least some embodiments, the software appliance runs within a curator's firewall. Depicted in FIG. 7, the embodiments of the SCA 142 includes an Administrative Module 601, a Realm Management Module 602, a Data Transport Module 603, a Key Store and Directory Module 604, a Crypto Engine Module 605, a CCS Interface Module 606, a GRC Portal Module 607, an a Policy Adaptor Module 608.

For at least some embodiments, the Administrative Module 601 performs various configuration and administrative tasks to configure the local SCA, to manage users and groups within the SCA control, to interface with human users through a command line interface (CLI) or a UI interface (UI), to interface with other programs through an application programming interface (API), to update SCA software from the connected CCS, and to send event logs to CCS via CCS Interface Module 506.

For at least some embodiments, the Realm Management Module 602 is responsible for creating and managing a realm. the Realm Management Module 602 performs tasks to invite or permit parties that are partially controlled by CCAs to join the realm. It is also capable of revoking a realm membership. For an embodiment, a realm is one or more curators that are controlled by one SCA. Parties participating in the trustworthy workflow must be enrolled in at least one realm.

For at least some embodiments, the Data Transport Module 603 is responsible for data upload and download. The data can be uploaded from any data source within the one or more curators controlled by the SCA and to any data repository in the cloud through any data transfer protocol such as email, HTTP, FTP, etc. or physical data storage media such as floppy disc, CD ROM, DVD ROM, USB Drive, etc., and vice versa. One source of data can be content containers controlled by Microsoft© SharePoint software.

For at least some embodiments, the Key Store and Directory Module 604 stores the realm user's secrets (such as their private/secret keys,) that are encrypted and copies of various certificates that can be used for the SCA cache access and offline operations.

For at least some embodiments, the Crypto Engine Module 605 performs various encryption/decryption, signing, and key generation functions.

For at least some embodiments, the CCS Interface Module 606 performs secure communications with CCS. At least some embodiments of the CCS Interface Module 606 include a RESTful interface Adapter—CRUD calls for data and control communications between the SCA and CCS, a WebSockets—Receive Callbacks from CCS, and a DNS Resolver—fast path for querying the CCS for directory (certificates) lookup and requesting for proxy re-encryption operations.

For at least some embodiments, the GRC Portal Module 607 is responsible for configuring logs, alerts and reports for the realm, querying, and receiving from, CCS for logs, alerts and reports, searching and indexing logs, and caching logs locally, and presenting the log information.

For at least some embodiments, the Policy Adaptor Module 608 provides integration interfaces with the existing data and identity management infrastructures in the one or more curators controlled by the SCA. For at least some embodiments, the interfaces include support for protocols and services such as, an Active Directory (AD), an Active Directory Federation Services (ADFS), a Certificate Authority (CA), a Security Assertion Markup Language (SAML), an Online Certificate Status Protocol (OCSP), and/or Proxy Services.

As previously described, the custodian is at least partially controlled by a cloud connect service (CCS) 132. For at least some embodiments, the CCS 132 is a collection of software running as Software as a Service (SaaS) in the cloud, hosted by one or multiple Infrastructure as a Service (IaaS) providers. It is a high-scale, always-on, possibly geo-distributed policy enforcement point, which can facilitate complex, possibly cross-continental collaboration and commerce. The CCS 132 is termed "Trustworthy", meaning that it cannot access any data or policy in the clear or cheat because it is prevented from doing so by cryptography based technologies. Without such a capability it would be technologically complex to monitor and enforce CCS 132 behavior, if at all that were to be possible.

Figure 8:
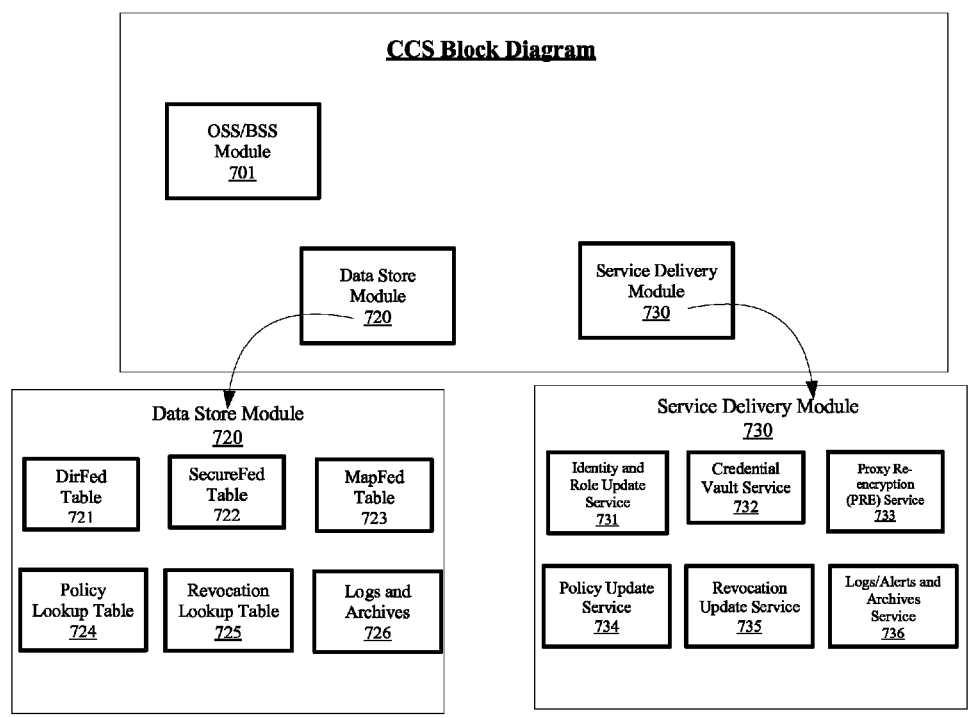
FIG. 8 shows a cloud connect service according to an embodiment.

As illustrated in FIG. 8, at least some embodiments of the CCS 132 include an OSS/BSS Module 701, a Data Store Module 720, a Service Delivery Module 730, a Crypto Engine Module 704, and a CCS/SCA Interface Module 705.

For at least some embodiments, the OSS/BSS Module 701 performs operations including provisioning, metering, billing, syndication, federations, and other external service interfaces. An embodiment of the OSS/BSS Module 701 provides customer support and trouble shooting.

For at least some embodiments, the Data Store Module 720 at least partially includes one or more of a DirFed Table 721, SecureFed Table 722, a MapFed Table 723, a Policy Lookup Table 724, a Revocation Lookup Table 725, and a Logs and Archives 726. For an embodiment, the DirFed Table 721 is a directory for user and group identities, certificates, policies and other artifacts, which are typically represented by the corresponding entity's public keys. For at least some embodiments, the SecureFed Table 722 stores encrypted secrets. For an embodiment, the CCS, nor any custodian, is able to decrypt any entry in this table. For at least some embodiments, the MapFed Table 723 stores, among others, Group membership records, represented, at least partially, through signed Proxy Re-encryption Keys, and Realm roles including attestations and signatures from the realm SCAs. For an embodiment, the Policy Lookup Table 724 provides rapid lookup for multi-hop re-encryption key chains. For an embodiment, the Revocation Lookup Table 725 provides rapid lookup for revocation lists. For an embodiment, the Logs and Archives 726 keeps activities logs and events. It also archives for policies and activities, as well as data.

For at least some embodiments, for each sub-module 721-726, the Service Delivery Module 730 includes at least a corresponding services delivered to CCAs and SCAs. For an embodiment, services 731-736 of the Service Delivery Module 730 may interact with multiple sub modules 721-726. For an embodiment, an Identity and Role Update Service 731 receives identity and role update requests from SCAs and CCAs and updates the corresponding DirFed 721 entries. For an embodiment, a Credential Vault Service 732 uploads and downloads the encrypted data, encrypted keys and encrypted policies upon requests from CCAs and SCAs, and updates entries in SecureFed 722 and Logs and Archives 726. For an embodiment, a Proxy Re-encryption (PRE) Service 733 receives Proxy Re-encryption Keys and Proxy Re-encryption operation requests from SCAs and CCAs, and performs the requested operations. It updates and reads entries in MapFed 723. It may also interact with Policy Lookup Table 724 and Revocation Lookup Table 725 to validate identities and authorizations. For an embodiment, a Policy Update Service 734 updates groups and group memberships in DirFed 721, upon requests from SCAs, among other tasks. For an embodiment, a Revocation Update Service 735 receives identity and role revocation requests from, primarily, SCAs and updates entries in MapFed 723 and Revocation Lookup Table 725. Among other sources, such requests may originate from the CA and OCSP interfaces in Policy Adaptor Module 608. For an embodiment, a Logs/Alerts and Archives Service 736 receives event logs from SCAs and CCAs and responds to SCAs (GRC Portal Module 607) requests The interaction methods between CCSs, SCAs and CCAs through above described modules and the combined system effects towards providing the trustworthy workflow across trust boundaries will become more apparent from the Operative Steps description as follows.

Other Descriptions

There is a growth of clouds (either hosted, or peer-to-peer) that could provide significant savings and functionality to consumers, businesses and other organizations, but these clouds also generate significant anxiety among organizations and individuals that this hidden composition of service providers and supervisors are not trustworthy. Therefore there is a growing trend to deploy cryptographic techniques so that the service providers (and hence the supervisors) are oblivious to the communications within that network, and have no access to any data that might be stored or transferred. However, the consequences of this are that the sharing of cryptographic keys tends to get complicated, and the network tends to get "dumbed down" because the service providers are limited in what value they can deliver with encrypted data. In addition, keys are frequently lost, and supervisors often tend to need legitimate (or other) access to these keys for law enforcement or other purposes. Therefore the service provider is typically compelled to implement "back doors" and to provide key escrowing capabilities. However due to the geo-scale, this can become quite complex due to the conflicting requirements of this multiplicity of supervisors that are typically mutually distrusting.

Although specific embodiments have been described and illustrated, the embodiments are not to be limited to the specific forms or arrangements of parts so described and illustrated.

What is claimed:

1. A method of a custodian securing a secret of a user, comprising:
   receiving, by a custodian server of a first custodian, encrypted shares, wherein the encrypted share are generated based on a secret of the user, a policy, and a plurality of public keys, comprising generating a plurality of shares from the secret, and encrypting each share utilizing a corresponding one of the plurality of public keys; and
   verifying, by the custodian server, that the encrypted shares can be used to reconstitute the secret upon receiving the encrypted shares, comprising leveraging, by the first custodian, one-way cryptographic functions, wherein the first custodian can reconstruct the secret, but cannot obtain access to the secret or any of the shares.

2. The method of claim 1, further comprising a plurality of adjudicators, wherein each of the plurality of public keys has a corresponding at least one adjudicator of the plurality of adjudicators, and a corresponding secret key.

3. The method of claim 1, further comprising escrowing the corresponding secret key of one or more of the plurality of public keys.

4. The method of claim 3, further comprising generating, encrypted shares based on the corresponding secret key, a policy, and a plurality of public keys, and providing the encrypted shares to a second custodian.

5. The method of claim 3, wherein escrowing the corresponding secret key comprises:
   generating, encrypted shares based on the corresponding secret key, a policy, and a plurality of public keys;
   splitting the encrypted shares; and
   providing the split encrypted shares between more than one custodian.

6. The method of claim 4, wherein the first custodian and the second custodian are part of a common network.

7. The method of claim 2, further comprising monitoring a loss of one or more of the plurality adjudicators.

8. The method of claim 1, wherein generating the encrypted shares based on the secret, a policy, and one or more public keys, is performed within a trust boundary.

9. The method of claim 1, wherein the first custodian comprises a cloud network.

10. The method of claim 1, wherein verifying, by the first custodian, that the encrypted shares can be used to reconstitute the secret is based upon the encrypted shares received by the first custodian, the public keys and the policy.

11. The method of claim 1, wherein approved parties can decrypt the shares, wherein approved parties comprise parties who have access to the encrypted shares.

12. The method of claim 1, wherein approved parties can decrypt the shares, wherein approved parties comprise parties who have secret keys that can decrypt the encrypted shares.

13. The method of claim 1, wherein the first custodian receives the encrypted shares, but cannot decrypt the secret shares.

14. A method of a custodian server securing a secret of a user, comprising:
   receiving, by a custodian server of a first custodian, encrypted shares, wherein the encrypted share are generated based on a secret of the user, a policy, and a plurality of public keys, comprising generating a plurality of shares from the secret, and encrypting each share utilizing a corresponding one of the plurality of public keys; and verifying, by the custodian server, that the encrypted shares can be used to reconstitute the secret upon receiving the encrypted shares;

wherein each of the plurality of public keys has a corresponding at least one adjudicator of a plurality of adjudicators, and a corresponding secret key; and further comprising monitoring a loss of one or more of the plurality adjudicators; and providing the user with an early warning if the loss of adjudicators exceeds a threshold, thereby allowing the user to select new or different adjudicators.

15. A custodian server of a custodian operative to:

receive encrypted shares, wherein the encrypted share are generated based on a secret of the user, a policy, and a plurality of public keys, and wherein a plurality of shares are generated from the secret, and each share is encrypted utilizing a corresponding one of the plurality of public keys; and verify that the encrypted shares can be used to reconstitute the secret upon receiving the encrypted shares, comprising leveraging, by the custodian, one-way cryptographic functions, wherein the custodian can reconstruct the secret, but cannot obtain access to the secret or any of the shares.

16. The custodian server of claim 15, wherein the custodian comprises a cloud network.

17. The custodian server of claim 15, wherein the custodian server being operative to verify that the encrypted shares can be used to reconstitute the secret is based upon the encrypted shares received by the custodian, the public keys and the policy.

* * * * *